United States Patent Office 3,359,213
Patented Dec. 19, 1967

3,359,213
PRODUCTION OF AQUEOUS SUSPENSION OF COLLOIDAL, CRYSTALLINE, HYDROUS OXIDES OF ZIRCONIUM AND HAFNIUM
Abraham Clearfield, Niagara Falls, N.Y., assignor to National Lead Company, New York, N.Y., a corporation of New Jersey
No Drawing. Filed Jan. 31, 1963, Ser. No. 255,198
6 Claims. (Cl. 252—313)

This invention relates to colloidal hydrous oxides of zirconium and hafnium and is particularly concerned with the production of such products in which at least part of the hydrous oxide is crystallized in the monoclinic system.

It is an object of the present invention to provide a novel process for producing colloidal hydrous oxides of zirconium and hafnium.

Another object of the present invention is to provide a novel process for producing colloidal hydrous oxides of zirconium and hafnium which are at least in part crystallized in the monoclinic system.

A further object of the invention is to produce fluid colloidal slurries of hydrous oxides of zirconium and hafnium that contain as high as 45% by weight of the oxide and in which the oxide particles are, at least in part, crystalline.

Other objects and advantages of the present invention will be apparent from the following description thereof. For the purpose of illustration the invention will be described primarily with respect to the production of colloidal hydrous zirconia. It will be understood, however, that the described procedures are also applicable to the production of colloidal hydrous hafnia and mixtures thereof with colloidal hydrous zirconia. Hafnium is always associated with zirconium in nature and is separated therefrom only with great difficulty since the chemical behaviors of zirconium and hafnium are more nearly identical than those of any other two elements. Accordingly, small amounts of either hydrous zirconia or hydrous hafnia with large amounts of the other are not for the purposes of the present invention considered impurities; and it will be evident that the reactions involved are applicable to such mixtures as well as pure hydrous zirconia or pure hydrous hafnia.

It has previously been known that suspensions of colloidal hydrous zirconia could be prepared by hydrolysis of dilute solutions of zirconium salts at temperatures in excess of 120° C. To achieve these high temperatures, it is necessary to autoclave the solutions. After hydrolysis, sols with solids contents of 10%–25% can be obtained by evaporation of the dilute sols. The colloidal particles of such sols show no evidence of crystallinity when examined by X-ray diffraction.

It has now been found that stable suspension of colloidal hydrous zirconia, at least part of which is crystallized in the monoclinic system, may be readily produced by refluxing a suspension of amorphous hydrous zirconia in an aqueous medium with a pH in the range of about 0.6 to 1.6. The pH of the slurry may be brought down to this range by the addition thereto of hydrochloric acid or nitric acid. A solution of zirconyl chloride or zirconyl nitrate, both of which ionize to give strongly acid solutions, may also be used. This procedure requires no autoclaving and the process is adapted for use with slurries containing quite high concentrations of hydrous zirconia. Consequently, highly concentrated, colloidal suspensions of hydrous zirconia may be directly prepared without the necessity of evaporating water from the product. The following examples illustrate the novel process.

Example 1

To 300 g. of freshly precipitated, amorphous hydrous zirconia (containing 19.2% $ZrO_2$) is added enough concentrated hydrochloric acid to form a slurry having a pH of 0.85. The slurry is placed in a flask and refluxed for 48 hours. There is obtained 270 ml. of a stable, milky white suspension of colloidal hydrous zirconia which has a sp. gr. of 1.21 and contains 200 g./l. of $ZrO_2$. At least a substantial part of the colloidal hydrous zirconia in the suspension is crystallized in the monoclinic system.

Example 2

To 100 g. of hydrous zirconia containing 18.8% $ZrO_2$ is added enough concentrated hydrochloric acid to form a fluid slurry with a pH of 1.0. The slurry is refluxed for 32 hours and a suspension is obtained in which all of the hydrous zirconia is colloidal, at least a substantial part thereof being crystallized in the monoclinic system. The specific gravity of the stable colloidal suspension is 1.22 and it contains 220 g./l. of $ZrO_2$.

Example 3

To 100 g. of hydrous zirconia containing 20.0% $ZrO_2$ is added enough concentrated nitric acid to form, when stirred, a fluid, homogeneous slurry with a pH of 1.1. The slurry is refluxed for 36 hours and a milky white, stable, colloidal suspension of hydrous zirconia is obtained. A substantial portion, at least, of the hydrous zirconia in the product is crystalline. The specific gravity of the suspension is 1.267.

Example 4

Hydrous zirconia containing 18.8% of $ZrO_2$ is air dried until the $ZrO_2$ content is 28.2%. Concentrated hydrochloric acid is stirred into 200 g. of the air dried hydrous zirconia until a fluid suspension with a pH of 0.9 is produced. This slurry is refluxed 48 hours to give a stable, colloidal suspension containing 24.8% $ZrO_2$ by weight and having a specific gravity of 1.278. At least a substantial portion of the hydrous zirconia is crystalline.

Example 5

Eight ml. of a saturated solution of zirconyl chloride is added to 100 g. of hydrous zirconia containing 20.0% of $ZrO_2$ and pulped to obtain a slurry. The pH of the slurry is adjusted to 1.1 with zirconyl chloride solution and the slurry is then refluxed for 47 hours. A stable, colloidal suspension containing 22.8% of $ZrO_2$ and having a specific gravity of 1.26 is obtained. It is found that substantially all the zirconium present in the zirconyl chloride has been converted to colloidal hydrous zirconia.

While the zirconyl salt is preferably added in solution, it will be evident that it can be added to the slurry of hydrous zirconia as a solid since it will, of course, dissolve in the water present. Indeed, the addition of zirconium tetrachloride and zirconium nitrate to such slurries is feasible since these salts are soluble and hydrolyze to the corresponding zirconyl salts which are highly acid.

Experiments have shown that by the present novel process colloidal suspensions of hydrous zirconia containing as high as 550 g./l. of $ZrO_2$ can be readily obtained and even higher concentrations may be secured by evaporation of water. Ordinarily, such concentrations could not be obtained, but it has been found that even with highly concentrated filter cakes of amorphous hydrous zirconia, containing up to 50% $ZrO_2$, the addition of the hydrochloric acid or nitric acid lowers the viscosity and produces a relatively thin slurry which can be easily refluxed. This is illustrated in:

Example 6

To 100 g. of hydrous zirconia having a 50.9% $ZrO_2$ content is added concentrated HCl with stirring to form a homogeneous slurry. The pH of the slurry is adjusted to 0.9 with HCl and it is then refluxed for 65 hours. A colloidal suspension of hydrous zirconia containing 44% $ZrO_2$ by weight is obtained. The hydrous zirconia particles in the suspension are at least in part crystalline. The suspension is stable and has a specific gravity of .664.

The pH to which the slurry is brought by the hydrochloric acid or nitric acid affects the viscosity of the slurry and also the refluxing time required to obtain a stable colloidal suspension. During the refluxing the pH of the slurry tends to decrease and its viscosity becomes still lower. It has been found that initial pH values of from about 0.6 to about 1.6 are most satisfactory for the slurries. An initial pH lower than about 0.6 results in dissolution of the hydrous zirconia. On the other hand, although slurries having initial pH values as high as about 3.0 can be used, inordinately long refluxing times are necessary to obtain complete transformation to a colloidal suspension. This is illustrated by:

Example 7

100 g. of hydrous zirconia containing 18.8% $ZrO_2$ is treated as in Example 2 except that only sufficient hydrochloric acid is added to obtain an initial pH of 2.0 in the slurry. After refluxing for 52 hours only about half of the slurry is colloidal, 90 hours of refluxing being necessary for obtaining a 100% colloidal suspension.

The colloidal suspensions of the present invention are stable up to pH values of 3-3.5 when the pH is raised by the slow addition of dilute ammonium hydroxide with careful stirring. Above pH values of about 3.5 the colloidal suspensions gel. As indicated above, the hydrous zirconia particles tend to dissolve if the pH of the suspension drops below about 0.6. They are, however, otherwise stable in extremely acid media. The particle size of the colloidal hydrous zirconia particles, as determined by line broadening of X-ray diffraction peaks, varies from about 3 m$\mu$ to 20 m$\mu$. The colloidal suspensions are quite fluid, even those containing about 45% $ZrO_2$ having such low viscosities that they flow like water.

As indicated above, colloidal hydrous zirconia produced by the process of the present invention is at least in part crystallized in the monoclinic system. Such crystallinity has been determined by conventional X-ray diffraction procedures. The proportion of the particles which are crystalline is, however, not accurately known since there is no practicable way to determine this.

The colloidal, hydrous zirconia particles may be obtained as a very fine, free flowing powder if care is taken to prevent agglomeration of the particles. This can be readily accomplished by the method described in the following example.

Example 8

100 parts by volume of a colloidal hydrous zirconia sol containing 20% solids was added to 300 parts by volume of acetone and thoroughly mixed. The mixture was centrifuged and the liquid was then decanted. The solid matter was redispersed in acetone and again centrifuged. After decanting the liquid, the solid matter was transferred to a Buchner funnel and sucked dry to obtain a soft, dry powder of extreme fineness.

The crystalline, colloidal hydrous zirconia of the present invention may be employed for many purposes. The suspensions or sols may be employed in making ceramic mixes where the zirconia adds refractoriness. The dry powdered, colloidal hydrous zirconia is useful as a pigment and may be used as a filler in elastomers and other plastic compositions. It is so finely divided that it is very reactive and has a high surface area, thus making it useful for catalytic purposes.

The dry colloidal hydrous zirconia is also useful in ceramics. For instance, it may be used as an opacifier in porcelain enamel frits. An example of such use is shown below.

Example 9

A mixture is made of 53.5 parts by weight of amblygonite, 54.5 parts by weight of aluminum hydrate, and 27.5 parts by weight of the colloidal hydrous zirconia obtained by following the procedure of Example 8. The mixture is ground together in a ball mill and then calcined at 1090° C. The calcined product is ground to a powder with an average particle size of about 0.5$\mu$ and may be employed, usually in a range of 1%-3%, as a mill addition to conventional enamel frits to improve their opacity.

In carrying out the novel process of the present invention the hydrous zirconia employed to produce the colloidal sols may be obtained in any conventional or known way and, as previously pointed out, may be in the form of a concentrated cake. Although freshly precipitated hydrous zirconia is preferred, it is not essential. In general, it is preferred to precipitate a gelatinous hydrous zirconia by addition of ammonium hydroxide to a solution of a zirconium salt.

It will be evident from the foregoing description of the invention that there is provided hereby a novel, convenient and efficient process for producing concentrated sols of hydrous oxides of zirconium and hafnium and novel crystalline, colloidal hydrous oxides of such metals which are adapted for many uses. It will be understood that commercial hydrous zirconia containing small amounts of impurities may be used in carrying out the invention as well as the pure hydrous oxides.

Percentages referred to herein are percentages by weight.

I claim:

1. A process for producing an aqueous suspension of a colloidal, crystalline hydrous metal oxide selected from the group consisting of hydrous zirconia, hydrous hafnia, and mixtures thereof from amorphous hydrous metal oxides of said group, which comprises forming an aqueous slurry from a precipitated mass of said amorphous hydrous metal oxide by mixing therewith a solution containing hydrogen ions and ions selected from the group consisting of chloride ions and nitrate ions in such amounts as to establish the pH of the mixture in the range from about 0.6 to about 3.0 and refluxing said slurry for a period of at least 24 hours whereby to form an aqueous colloidal suspension of said hydrous metal oxide at least in part in crystalline form.

2. The process set forth in claim 1 in which the pH of the slurry is established in the range from about 0.6 to about 1.6.

3. The process set forth in claim 2 in which the slurry is refluxed for a period of from 24 hours to 48 hours.

4 The process set forth in claim 3 in which the hydrous metal oxide is hydrous zirconia.

5. The process set forth in claim 3 in which the hydrous metal oxide is hydrous hafnia.

6. The process set forth in claim 3 in which the hydrous metal oxide is a mixture of hydrous zirconia and hydrous hafnia.

References Cited

UNITED STATES PATENTS 2,984,628   5/1961   Alexander et al. _____ 252—313
3,110,681   11/1963  Meadows et al. _____ 252—313

LEON D. ROSDOL, *Primary Examiner.*

JULIUS GREENWALD, *Examiner.*

R. D. LOVERING, *Assistant Examiner.*